United States Patent
Lee

(10) Patent No.: US 8,903,873 B2
(45) Date of Patent: Dec. 2, 2014

(54) FILE INFORMATION SYSTEM MANAGEMENT SYSTEM AND METHOD

(75) Inventor: Seung Hwan Lee, Gyeonggi-do (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 93 days.

(21) Appl. No.: 13/299,933

(22) Filed: Nov. 18, 2011

(65) Prior Publication Data

US 2012/0179729 A1 Jul. 12, 2012

(30) Foreign Application Priority Data

Jan. 10, 2011 (KR) .................. 10-2011-0002256

(51) Int. Cl.
G06F 9/445 (2006.01)
G06F 17/30 (2006.01)

(52) U.S. Cl.
CPC .......... *G06F 9/445* (2013.01); *G06F 17/30194* (2013.01)
USPC ....................................... 707/822

(58) Field of Classification Search
USPC ....................................... 707/822
See application file for complete search history.

(56) References Cited

U.S. PATENT DOCUMENTS

| | | | |
|---|---|---|---|
| 6,694,336 B1* | 2/2004 | Multer et al. | 1/1 |
| 8,516,125 B2* | 8/2013 | Rosenblatt et al. | 709/227 |
| 8,526,885 B2* | 9/2013 | Lin et al. | 455/41.3 |
| 2008/0096544 A1* | 4/2008 | McNamara et al. | 455/424 |
| 2009/0157512 A1* | 6/2009 | King | 705/14 |
| 2009/0177530 A1* | 7/2009 | King et al. | 705/10 |
| 2009/0252130 A1* | 10/2009 | Sheth et al. | 370/338 |
| 2010/0081385 A1* | 4/2010 | Lin et al. | 455/41.3 |
| 2011/0305337 A1* | 12/2011 | Devol et al. | 380/259 |

OTHER PUBLICATIONS

Patently Apple Blog: "Apple Getting Serious About Near Field Communication on the iPhone" posted on, Feb. 18, 2010.*
Anonymous; "Bluetooth File Transfer (Android) Version 3.95;" Medieval.it; Nov. 3, 2010; Retrieved from internet: http://www.medieval.it/bluetooth-file-transfer-android-version-395/menu-id-66. html [rtrvd. on Jun. 13, 2012]; XP002677683.
Bernhardt, Paul; "Web Development—Create 1-12 Client/Server Connections for Bluetooth Devices: SPP/OPP/OBEX— BlackBerry;" Blackberry; Sep. 18, 2009; Retrieved from internet: http://www.youtube.com/watch? v=egHB3JmB_d4 [rtrvd. on Jun. 14, 2012]; XP002677684.

* cited by examiner

*Primary Examiner* — Sheree Brown
(74) *Attorney, Agent, or Firm* — Cha & Reiter, LLC

(57) ABSTRACT

A method and system is provided for editing a file information system of a host device by using a client device connected to the host device via a Near Field Communication (NFC) channel while maintaining the foreground-running application execution screen of the host device. A method for managing a file information system of a host device by using a client device according to the present invention includes establishing a near field communication channel between the client device and the host device; copying the file information system from the host device to the client device; editing, at the client device, the file information system by means of an application selected in the file information system; and updating the file information system stored in the host device with the edited file information system which is transmitted from the client device to the host device.

18 Claims, 9 Drawing Sheets

FIG. 9
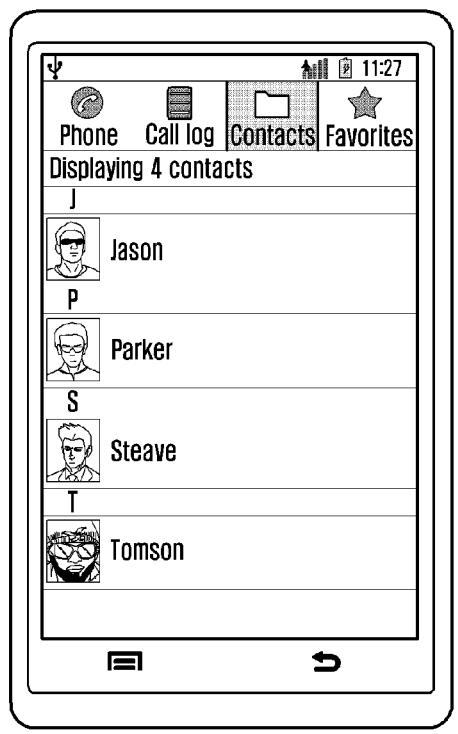
PHONEBOOK SCREEN (a)
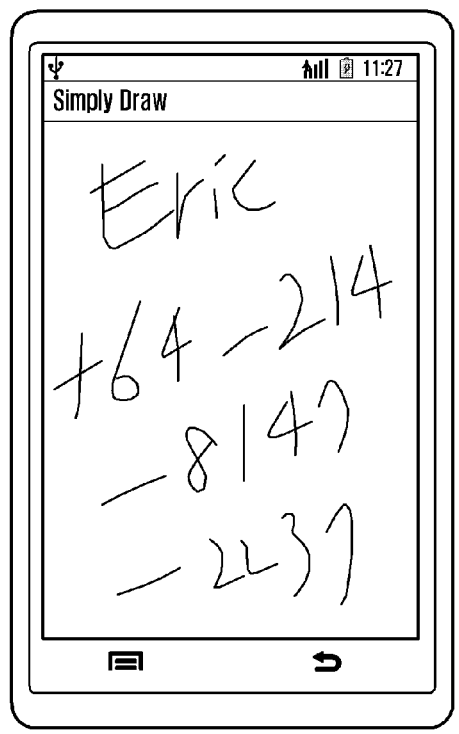
MEMO FUNCTION SCREEN (b)
PHONEBOOK CORRECTION (c)
MESSAGE SCREEN (d)

FILE INFORMATION SYSTEM MANAGEMENT SYSTEM AND METHOD

CLAIM OF PRIORITY

This application claims the benefit of priority under 35 U.S.C. §119 of an application filed in the Korean Intellectual Property Office on Jan. 10, 2011 and assigned Serial No. 10-2011-0002256, the contents of which are hereby incorporated by reference in its entirety.

BACKGROUND OF THE INVENTION

1. Field of the Invention

The present invention relates to a method and system for managing a file information system of a host device by means of a client device. In particular, the present invention relates to a method and system for editing a file information system of a host device remotely by means of a client device connected to the host device via a Near Field Communication (NFC) channel while maintaining the foreground-running application execution screen of the host device.

2. Description of the Related Art

Recently, mobile terminals are becoming multimedia devices integrating various supplementary functions such as electric organizer function, game console function, and schedule manager function. As the number of supplementary functions supported by a mobile terminal grows, the user interface becomes one of the most important feature in managing various functions and services efficiently.

In an exemplary situation where the terminal user is in the middle of the voice communication using the mobile terminal, it is necessary for the user to place the mobile terminal, particularly, a part where the speaker is positioned, near the user's ear. In such a case, it is impossible for the user, without removing the mobile terminal from the ear, to perform another task such as checking, editing, and saving data (e.g., contact list, schedule, or text message).

Also, the user may encounter a situation where it is necessary to edit a memory or check an incoming text message in the middle of another task such as watching video, surfing website, and listening to MP3 music. In such a case, except for the process running on the foreground of which execution screen is displayed on the display, the other processes run in the background without display of their execution screens. This means that the user cannot control another application without deactivating the foreground-running application.

SUMMARY OF THE INVENTION

In order to solve the problems of the prior art, the present invention provides a method and system for editing a file information system of a host device remotely by means of a client device connected to the host via a NFC channel while maintaining the foreground-running application execution screen of the host device.

Also, the present invention provides a method and system for editing a file information system of a host device that is capable of checking and editing a file (e.g., contact list, schedule, or memo) without removing the mobile terminal from the user's ear in the middle of the voice communication.

Another aspect of the invention is displaying content associated with the editing in the client device, and not in the host device.

Furthermore, the present invention provides a method and system for editing a file information system of a host device that is capable of reducing the missing probability of the client device coupled to the host device via a NFC connection by outputting an alarm sound when the distance between the host and client device becomes greater than a predetermined value.

In accordance with an aspect of the present invention, a method for managing a file information system of a host device by using a client device includes establishing a near field communication channel between the client device and the host device; copying the file information system from the host device to the client device; editing, at the client device, the file information system by means of an application selected in the file information system; and updating the file information system stored in the host device with the edited file information system which is transmitted from the client device to the host device.

In accordance with another aspect of the present invention, a system for managing a file information system of a host device by using a client device includes a host device having a file information system which establishes a near field communication channel with a client device, transmits the file information system to a client device via the near field communication channel, and receives an edited file information system from the client device; and a client device which establishes the near field communication channel with the host device, copies the system information file from the host device, executes an application selected in the file information system, edits the file information system by means of the executed application, and transmits the edited file information system to the host device via the near field communication channel.

BRIEF DESCRIPTION OF THE DRAWINGS

FIG. 9 is a diagram illustrating front views of the client device that are presenting exemplary screen images related to file information system management method according to an embodiment of the present invention.

DETAILED DESCRIPTION OF THE INVENTION

Exemplary embodiments of the present invention are described with reference to the accompanying drawings in detail. The same reference numbers are used throughout the drawings to refer to the same or like parts. For the purposes of clarity and simplicity, detailed description of well-known functions and structures incorporated herein may be omitted to avoid obscuring the subject matter of the present invention.

Figure 1:
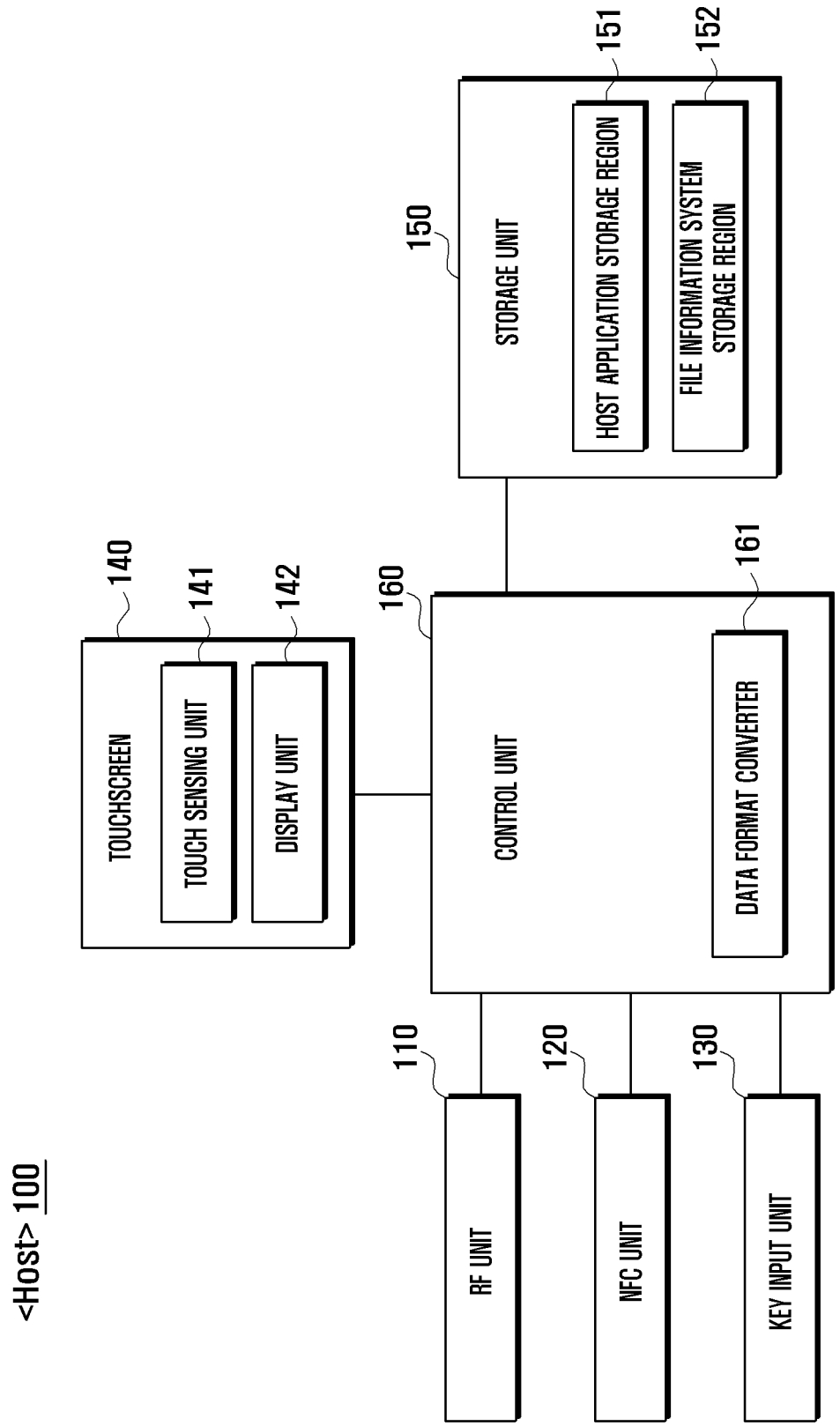
FIG. 1 is a block diagram illustrating a configuration of a host device for supporting the remote file information system management method according to an embodiment of the present invention.

FIG. 1 is a block diagram illustrating a configuration of a host device for supporting the remote file information system management method according to an embodiment of the present invention. As shown in FIG. 1, the host device 100 includes a Radio Frequency (RF) unit 110, a short range wireless communication unit (or Near Field Communication; NFC) unit 120, a key input unit 130, a touchscreen 140, a storage unit 150, and a control unit 160.

The RF unit 110 is responsible for radio communication of the host device 100 to transmit/receive data. The RF unit 110 can include an RF transmitter for up-converting and amplifying the transmission signal and an RF receiver for low noise amplifying and down-converting the received signal. The RF unit 110 also outputs the data received over the radio channel to the control unit 160 and transmits the data output by the control unit 160 over the radio channel.

The NFC unit 120 is responsible for data communication with a mobile device, particularly a client device 300 (see FIG. 3), via a contactless connection. The NFC is a technology for data communication between two devices equipped with a contactless short range wireless communication module operating at 13.56 MHz frequency band in the range of about 10 cm, the NFC including Radio Frequency Identification (RFID). The NFC can be implemented in one of a peer-to-peer mode, a Read/Write mode, a Card Emulation mode. If the NFC device can be connected directly to transmit data such as video and contact data in the peer-to-peer mode, read and save data in Read/Write mode, and perform contactless data transaction with a smart chip built in a card in the Card Emulation mode. According to an embodiment of the present invention, the NFC unit 120 establishes a connection with the client device 300 to transmit and receive control signal and/or data.

Further, according to an embodiment of the present invention, the NFC unit 120 can support at least one of Bluetooth, ZigBee, Ultra Wideband (UWB), and their equivalents.

The key input unit 130 generates an input signal corresponding to a key input by the user for controlling the host device 100 to the control unit 160. The key input unit 130 can be implemented with a keypad including numeral keys, navigation keys, and function keys. In case that the touchscreen 140 supports all input commands necessary for manipulating of the host device 100, the key input unit 130 can be omitted.

The touchscreen 140 includes a touch sensing unit 141 and a display unit 142. The touch sensing unit 141 detects a touch input made by the user on the touchscreen 140. The touch sensing unit 141 can be implemented with one of capacitive overlay type, pressure type, resistive overly type, infrared beam type sensors, or a pressure sensor. The touch sensing unit 141 can also be implemented with other type of sensing devices that can detect a contact of or pressure by an object, as well as the aforementioned sensors. The touch sensing unit 141 generates a detection signal corresponding to a touch input made by the user and transfers the detection signal to the control unit 160. The detection signal includes coordinates at which the touch input made by the user. In case that the user makes a movement gesture without releasing the touch mode on the screen, the touch sensing unit 141 generates the detection signal including the coordinates on the movement path and transfers the detection signal to the control unit 160.

The display unit 142 can be implemented with one of Liquid Crystal Display (LCD), Organic Light Emitting Diodes (OLED), and Active Matrix Organic Light Emitting Diodes (AMOLED); and presets menus, user input data, function setting information, and other information to the user in visual data format. The display unit 142 displays a booting screen of the host device 100, a standby screen, a menu screen, a call progressing screen, and other application execution screens.

Although the description is directed to the host device equipped with the touchscreen 140, the present invention is not limited the touchscreen-enabled device. Here, the touchscreen 140 can be replaced by a normal display device supporting only the function of the display unit 142.

The storage unit 150 is responsible for storing programs and data necessary for the operation of the host device 100 and can be divided into a program region and a data region. The program region can store the program for controlling the operations of the host device 100, the Operating System (OS) for booting up the host device 100, application programs necessary for playing multimedia contents, and application programs necessary for supporting other optional functions of the host device 100 such as camera function, audio playback function, and still and motion picture playback function. The data region stores the data generated as a result of the operations of the host device 100 such as still image, video, phonebook, and audio data.

Particularly in an embodiment of the present invention, the storage unit 150 can include a host application storage region 151 and a file information system storage region 152.

The host application storage region 150 is a region as a part of the program region for storing the applications related to the multimedia content playback application, phonebook data, memo, and Short Messaging Service (SMS). The term 'host' is used to emphasize the application stored in the host device 100 and differentiate the client applications, which are described later.

The file information system storage region 152 stores the predefined architecture of the information on the operation of the host 100, system files necessary for providing multimedia, and the application files. The file information system has a hierarchal structure of a top most folder, sub-system folder, and application folders; and each folder can include files and/or subfolders.

Figure 2:
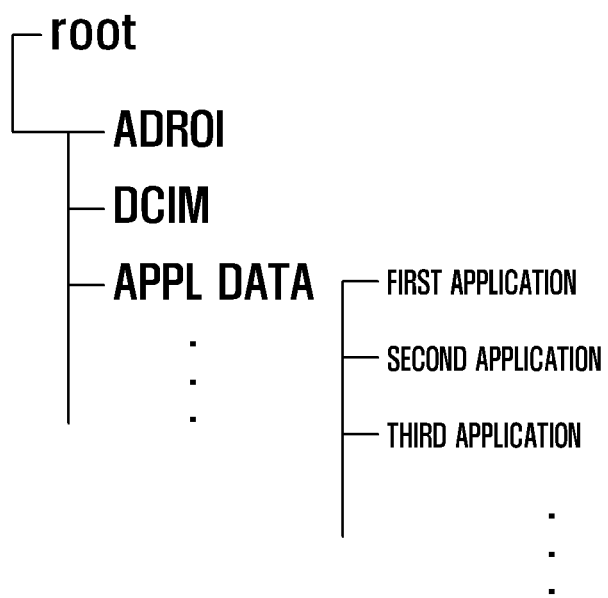
FIG. 2 shows an exemplary hierarchal architecture of the file information system according to an embodiment of the present invention.

FIG. 2 shows an exemplary hierarchal architecture of the file information system according to an embodiment of the present invention.

As shown in FIG. 2, the file information system includes a root folder as the top most folder, subsystem folders 'ADROI', 'DCIM', and 'APPL DATA'. The 'APPL DATA' folder includes 'first application' folder, 'second application' folder, and 'third application' folder; and each application folder includes corresponding application files.

According to an embodiment of the present invention, the file information system can be transmitted to the client device 300, edited, and updated partially or fully according to the request made by the client device 300.

The control unit 160 controls the operations of the internal function blocks of the host device 100. Particularly in an embodiment of the present invention, the control unit 160 controls establishing connection to the client device 300 via short range wireless communication channel and editing the information of the host device by means of the client device 300 without changing the currently displayed screen.

In operation, when a file information system transfer (copy) request is received from the client device 300, the control unit 160 of the host device 100 controls such that entire or some the folders of the requested file information system is transmitted to the client device 300. When a file information system lock request is received from the client device 300, the control unit 160 controls such that the file information system saved in the file information system storage region is locked. Also, when a file information system unlock request is received from the client device 300, the control unit 160 controls such that the locked file information system stored in the file information system storage region is unlocked. Furthermore, when an edited file information system is received from the client device 300, the control unit 160 can update the old file information system with the received file information system.

In the embodiment of the present invention, the control unit 160 can include a data format converter 161.

The data format converter 161 converts the data of application level (particularly, file information system) to a data format appropriate for short range wireless communication. According to an embodiment of the present invention, the data format converter 161 can be the Object Exchange (OBEX) protocol as a protocol for exchanging binary objects between devices.

Figure 3:
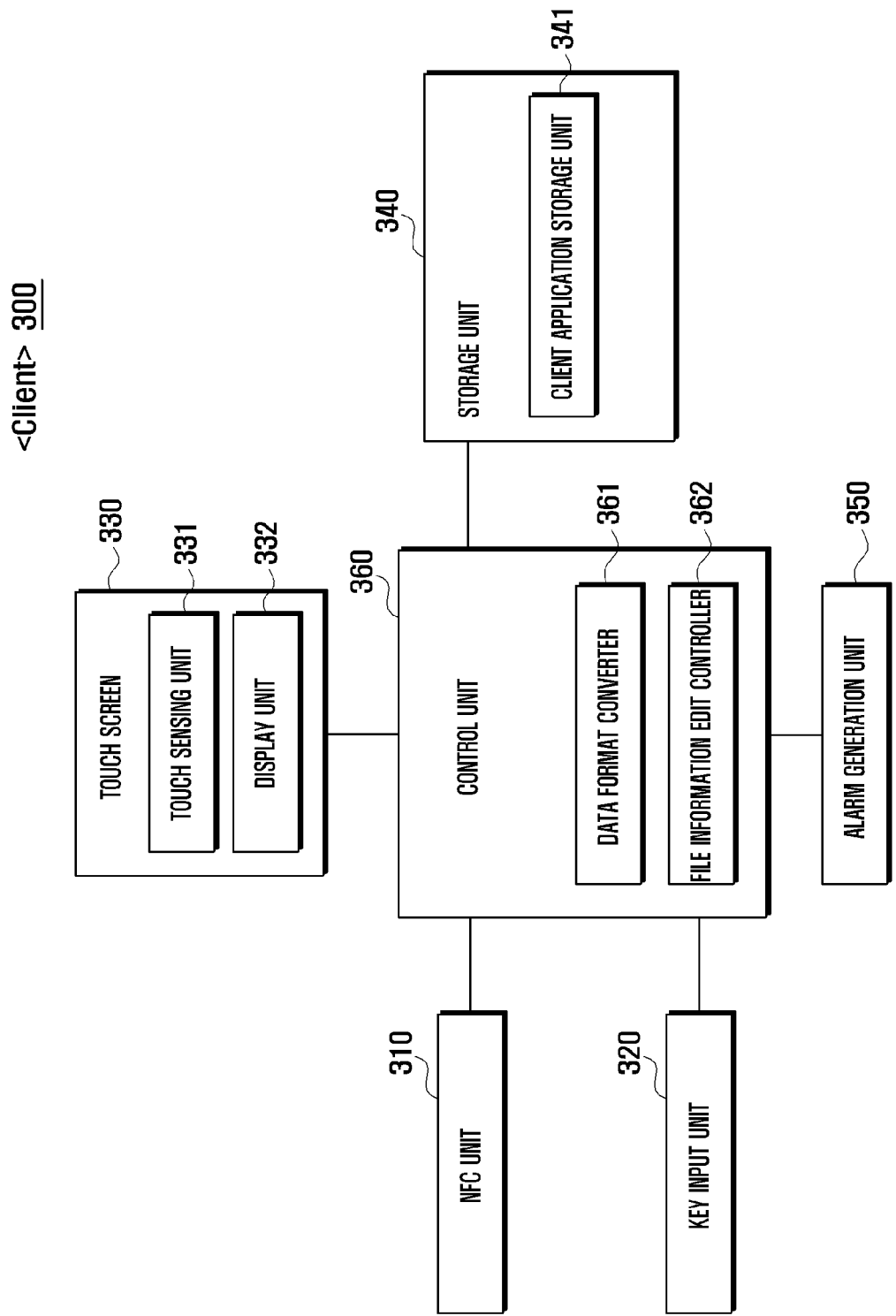
FIG. 3 is a block diagram illustrating a configuration of a client device for supporting the remote file information system management method according to an embodiment of the present invention.

FIG. 3 is a block diagram illustrating a configuration of a client device for supporting the remote file information system management method according to an embodiment of the present invention. As shown in FIG. 3, the client device 300 according to an embodiment of the present invention includes a NFC unit 310, a key input unit 320, a touchscreen 330, a storage unit 340, an alarm generation unit 350, and a control unit 360. The detailed descriptions on the features of the client device 300 identical with those of the host device 100 that are described with reference to FIG. 1 are omitted to avoid redundancy.

The NFC unit 310 is responsible for data communication with the host device 100 via a contactless connection.

The key input unit 320 generates an input signal corresponding to a key input by the user for controlling the client device 300 and transfers the input signal to the control unit 160. In case that the touchscreen 330 of the client device 300 supports all kind of inputs necessary for manipulating the client device 300, the key input unit 320 can omitted.

The touchscreen 330 includes a touch sensing unit 331 and a display unit 332. The touch sensing unit 141 detects a touch input made by the user. Since the touch screen 330 of the client device 330 operates in the same way as the touchscreen 140 of the host device 100 that has been explained already with reference to FIG. 1, thus detailed description on the touchscreen 330 is omitted herein. According to an embodiment of the present invention, the touchscreen 330 can receive the signal input for editing the file system information received from the host device 100.

The storage unit 340 is responsible for storing the programs and data necessary for the operation of the client device 300 and can be divided into a program region and a data region. In the embodiment of the present invention, the storage unit 340 can include a client application storage region 341 for storing client applications. The client application corresponds to the host application and is composed of some program functions related to the editing functions such as displaying, editing, and saving data among the program functions of the host device 100. In an exemplary case of SMS application, if the host SMS application supports all of the SMS-related functions including transmission, setting, message composition, message saving, and message editing functions; the client SMS application supports the message composition, message saving, message correcting, and message editing function except for the SMS transmission and setting functions.

When an alarm request signal is received from the control unit 360, the alarm generation unit 350 generates an alarm. The alarm can be output in the form of a sound, light, and/or a vibration.

The control unit 360 controls the operations of the internal function blocks of the client device 300. According to an embodiment of the present invention, the client device 300 is connected to the host device 100 via a NFC channel, the control unit 360 accesses the file information system of the host device 100 to copy the file information system to the client device 300 and displays the file information system on the screen. For this purpose, the control unit 360 can include a data format converter 361 and a file information system edit controller 362.

The data format converter 361 converts the file information system received from the host device 100 via the NFC channel to a data format executable in the application level. According to an embodiment of the present invention, the data format converter 161 can be the OBject EXchange (OBEX) protocol as the protocol for exchanging binary objects between devices. The data format converter 361 also converts the edited file information system to a format appropriate for transmission over the NFC channel.

The file information system edit controller 362 requests the host device 100 to transmit the file information system and receives the file information system transmitted by the host device 100. The file information system edit controller 362 also polls the host device 100 periodically to monitor whether it is necessary to edit or update the file information system of the host device 100.

When a file information system edit command is input by the user, the file information system edit controller 362 executes an application corresponding to the edit command to display the related information on the screen. For example, if the user accesses the memo application of the file information system displayed on the display unit 332 and enters the edit command for editing a memo, the file information system controller 362 executes the client memory application and displays a memo editing screen on the display unit 332.

In operation, when the file information system edit command is received, the file information system edit control unit 362 can transmit a file information system lock signal to the host device 100 to prevent the file information system from being edited in both the host device 100 and the client device simultaneously. Upon receipt of the file information system lock signal, the host device 100 locks its file information system so as not to be modified. If an edit complete signal is received, the file information system edit control unit 362 transmits a file information system unlock signal to the host device such that the edited file information system can be written in the host device 100.

Although the description is directed to the case where the control unit 360 includes the data format converter 361 and the file information system edit controller 362 to execute different functions, the functions of the data format converter 361 and the file information system edit controller 362 can be performed by the control unit 360 in an alternate embodiment.

Figure 4:
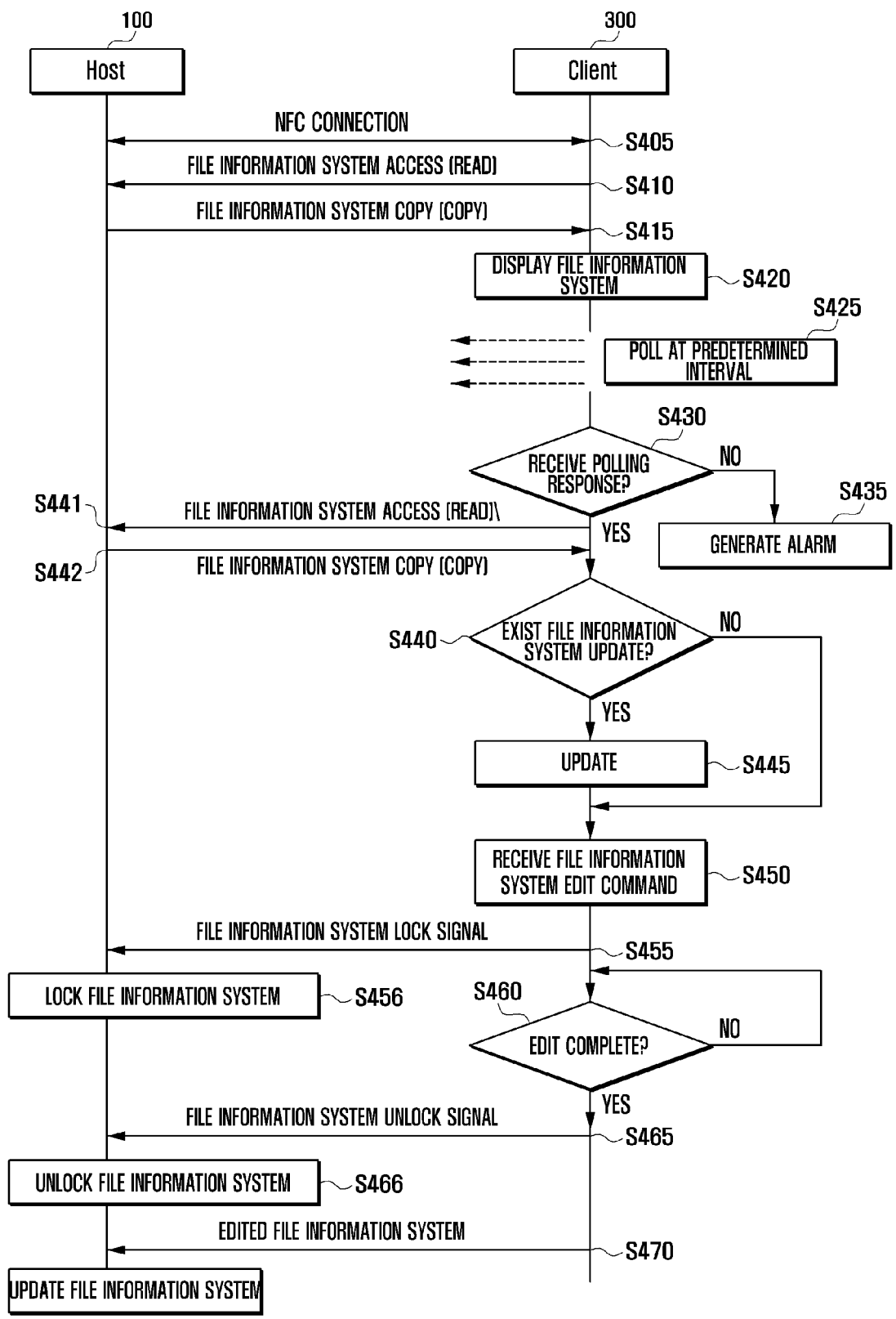
FIG. 4 is a signaling diagram illustrating operations of the host and client devices in the remote file information system management method according to an embodiment of the present invention.

FIG. 4 is a signaling diagram illustrating operations of the host and client devices in the remote file information system management method according to an embodiment of the present invention.

First, the host device 100 and the client device 300 are in communication with each other via an NFC connection (S405). The connection procedure can include a discovery process for discovering the counterpart device to transmit data, an authentication process for authenticating each other, and a connection establishment process for establishing a physical channel between two devices.

Once the NFC connection is established between the host and client devices, the client device 300 accesses the file information system of the host device 100 through the NFC channel (S410). Next, the client device 300 copies the file information system from the file information system storage region 152 of the host device 100 and saves the copied file information system in its own storage unit 340. Here, the client device 300 can copy all or a part of the file information system of the host device 100. For example, the client device 300 can request to copy only the file information system of the SMS application. In the exemplary embodiment of FIG. 4, it is assumed that the entire file information system is copied and edited.

Once the file information system is acquired, the client device 300 displays the file information system on the display unit 332. The file information system can be structured as shown in FIG. 2. Although the file information system depicted in FIG. 2 is the file information system of the host device 100, the client device 300 can copy the same file information system of the host device 100 while maintaining the structure. That is, the file information system of the host device and the file information system of the client device are the same.

Next, the client device 300 transmits a polling signal to the host device 100 at a predetermined interval (S425). The client device 300 determines whether a response signal is received from the host device 100 in response to the polling signal (430). The polling response signal can include information about whether the file information system stored in the host device 100 is changed after it is copied to the client device 300.

If no polling response signal is received, the client device 300 determines that the host device is out of the range and thus outputs an alarm (S435).

If the polling response signal is received, the client device 300 determines whether the file information system of the host device 100 has been changed (S440). If it is determined that the file information system of the host device 100 has been changed, the client device 300 copies the file information system again through steps S411 to S445. Note that the polling response signal can include information about whether the file information system stored in the host device 100 is changed after it is copied to the client device 300.

The client device 300 executes the application selected by the user among the applications contained in the file information system and displays the execution screen of the selected application. Next, the client device 300 receives an edit command for the executed application (S450). In more detail, the client device 300 first displays the acquired file information system structured as shown in FIG. 2 on the display unit 332. The user can select an application folder and execute the corresponding application. For example, if the SMS application is selected, the client device 300 executes the SMS application such that the SMS edit screen is displayed as shown in part (d) of FIG. 9. The user can edit the SMS-related data on the SMS edit screen.

When the file information system edit command is received, the client device 300 transmits a file information system lock signal to the host device 100 (S455). This is to prevent the host and client devices 100 and 300 from editing the file information system simultaneously to cause synchronization failure. Upon receipt of the file information system lock signal, the host device locks the file information system (S456).

If an edit complete signal is input (S460), the client device 300 transmits a file information system unlock signal to the host device 100 (465). Upon receipt of the file information system unlock signal, the host device 100 unlocks the file information system such that it can be edited (S466).

Next, the client device 300 transmits the edited file information system to the host device 100 (S470). If the edited file information system is received, the host device 100 updates the old file information system stored in the file information system storage region with the edited file information system (475). Steps S465 to S466 can be explained as a process in which the client device 300 access the host device 100 through the NFC channel to write the edited file information system in the file information system storage region of the host device 100.

A description is made of the remote file information system management method in more detail with an exemplary embodiment of the present invention. In the exemplary embodiment, the user edits the SMS, Email, memo, and phonebook data of the host device 100 by means of the client device 300.

Figure 5:
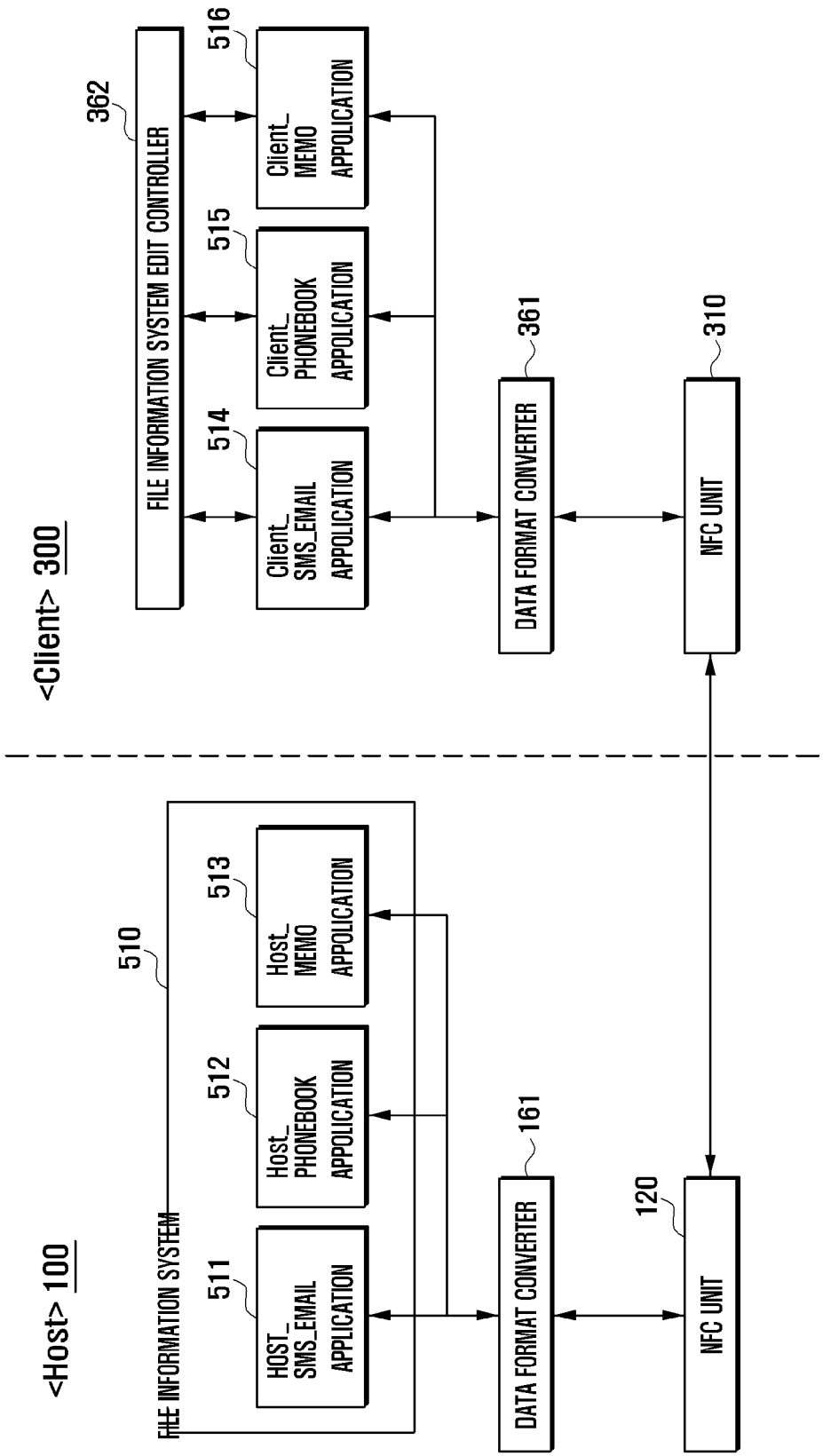
FIG. 5 is a diagram illustrating communication between the host device and the client device of the remote file information system management system according to an embodiment of the present invention.

In FIG. 5, the host device 100 of FIG. 1 and the client device 300 of FIG. 3 are depicted in hierarchal structure. That is, the internal function blocks are arranged according to the signal and data flows.

As shown in FIG. 5, the host device 100 includes the file information system 510. In this case, the sub-application of the file information system 510 includes a host SMS/Email application 511, a Host phonebook application 512, and a host memo application 513. The host device 100 includes a data format converter 161 for converting the file information system to a format appropriate for transmission via NFC connection or converts the data received over the NFC connection to the file information system format and a NFC unit 120 establishing the NFC connection.

The client device 300 includes an NFC unit 310 for establishing the NFC connection and a data format converter 361. The client device 300 also includes a client SMS/Email application 514, a client phonebook application 515, and a client memo application 516. The client device 300 also includes a file information system edit controller 362 for editing the file information system.

Figure 6:
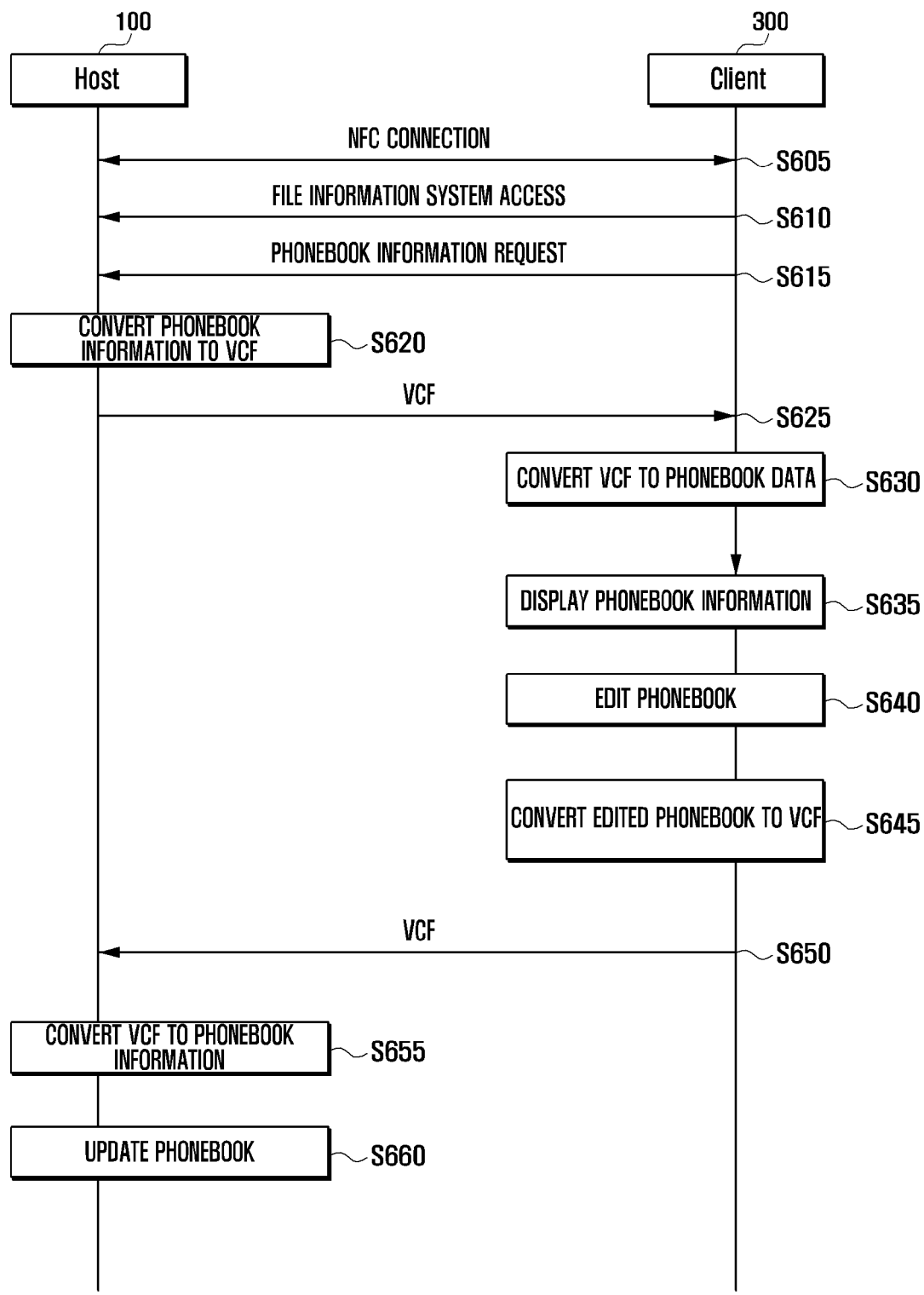
FIG. 6 is a signaling diagram illustrating a procedure for editing phonebook information of the host device by means of a client device in the remote file information system management method according to an embodiment of the present invention.

A description is made of the information edit method according to an exemplary embodiment of the present invention with reference to FIGS. 5 and 6. Particularly in the signaling diagram in FIG. 6, the phonebook information of the host device 100 is edited by means of the client device 300.

In FIG. 6, the host device 100 and the client device 300 connect to each other via NFC connection (S605). Once the NFC connection is established, the client device 300 accesses the file information system of the host device 100 (S610) and requests the host device 100 for the phonebook information (S615), for example. Upon receipt of the phonebook information request, the host device 100 converts the phonebook information to a vCard File (vcf) (S620) and transmits the vcf file to the client device 300 (S625). In FIG. 6, note that the process for converting the vcf file to a format appropriate for the NFC standard is readily apparent to those skilled in this art, thus omitted.

Upon receipt of the vcf file, the client device 300 converts the received vcf file to the phonebook information by means of the client phonebook application 515 (S630). Next, the client device 300 displays the recovered phonebook information (data) on the display unit (S635). The phonebook information displayed on the client device 300 includes contact items, each having a photo and name, ordered from the top to the bottom as shown in part (a) of FIG. 9.

If a phonebook edit command is input, the client device 300 displays a phonebook edit screen (S640). An exemplary phonebook edit screen is shown in part (d) of FIG. 9. The phonebook edit screen of the client device 300 is identical with that of the phonebook edit screen of the host device 100. As shown in part (d) of FIG. 9, the user can edit the name, phone number, email, address, group, and organization of a certain subscriber listed in the phone book.

If a phonebook edit complete command is input, the client device 300 stores the edited phonebook information and converts the stored phonebook information to the vcf (S645). Next, the client device 300 transmits the vcf to the host device 100 (650).

Upon receipt of the vcf, the host device 100 converts the vcf to the phonebook information by means of the host phonebook application (S655) and updates the phonebook data of the file information system (S660).

Figure 7:
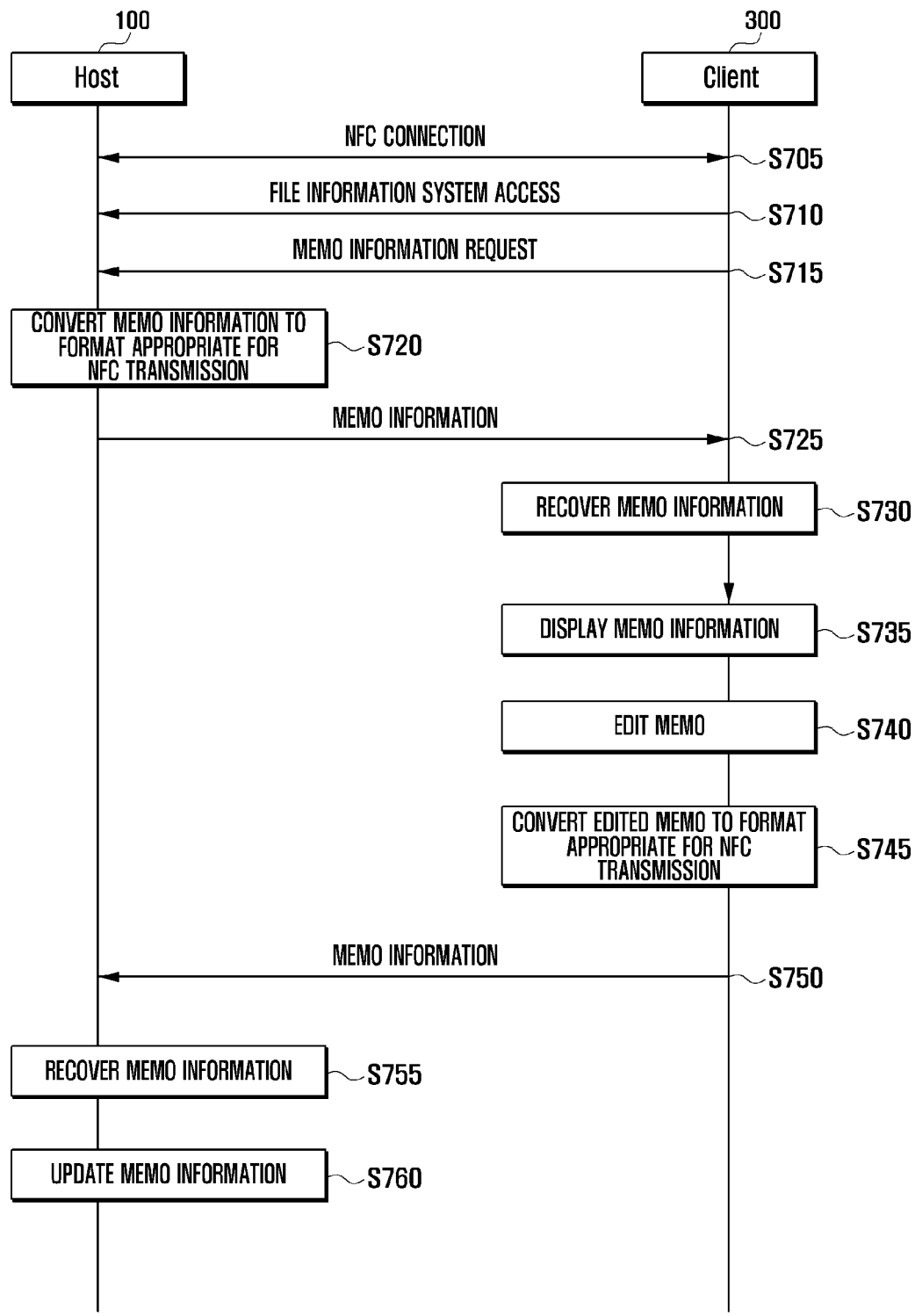
FIG. 7 is a signaling diagram illustrating a procedure for editing memo information of the host device by means of a client device in the remote file information system management method according to an embodiment of the present invention.

FIG. 7 is a signaling diagram illustrating a procedure for editing memo information of the host device by means of a client device in the remote file information system management method according to an embodiment of the present invention.

First, the host device 100 and the client device 300 connect to each other via an NFC connection (S705). Once the NFC connection is established the client device 300 accesses the file information system of the host device 100 (S710) and requests the hosts device 100 for the memo information (S715), for example.

Upon receipt of the memo information request, the host device 100 converts the memo information to a format appropriate for the NFC transmission (S720) and transmits the converted memo information to the client device 300 (S725).

Upon receipt of the converted memo information, the client device 300 recovers the original memo information from the converted memo information by means of the client memo application (730) and displays the recovered memo information on the display unit (S735). Next, the client device 300 edits the memo information according to the user's edit command (S740).

If a memo edit complete command is input, the client device 300 converts the edited memo information to a format appropriate for NFC transmission (S745) and transmits the converted memo information to the host device 100 (S750).

Upon receipt of the converted memo information, the host device recovers the original edited memo information from the converted memo information received via the NFC connection (S755). Next, the host device 100 updates the old memo information with the edited memo information by means of the host memo application (S760).

Figure 8:
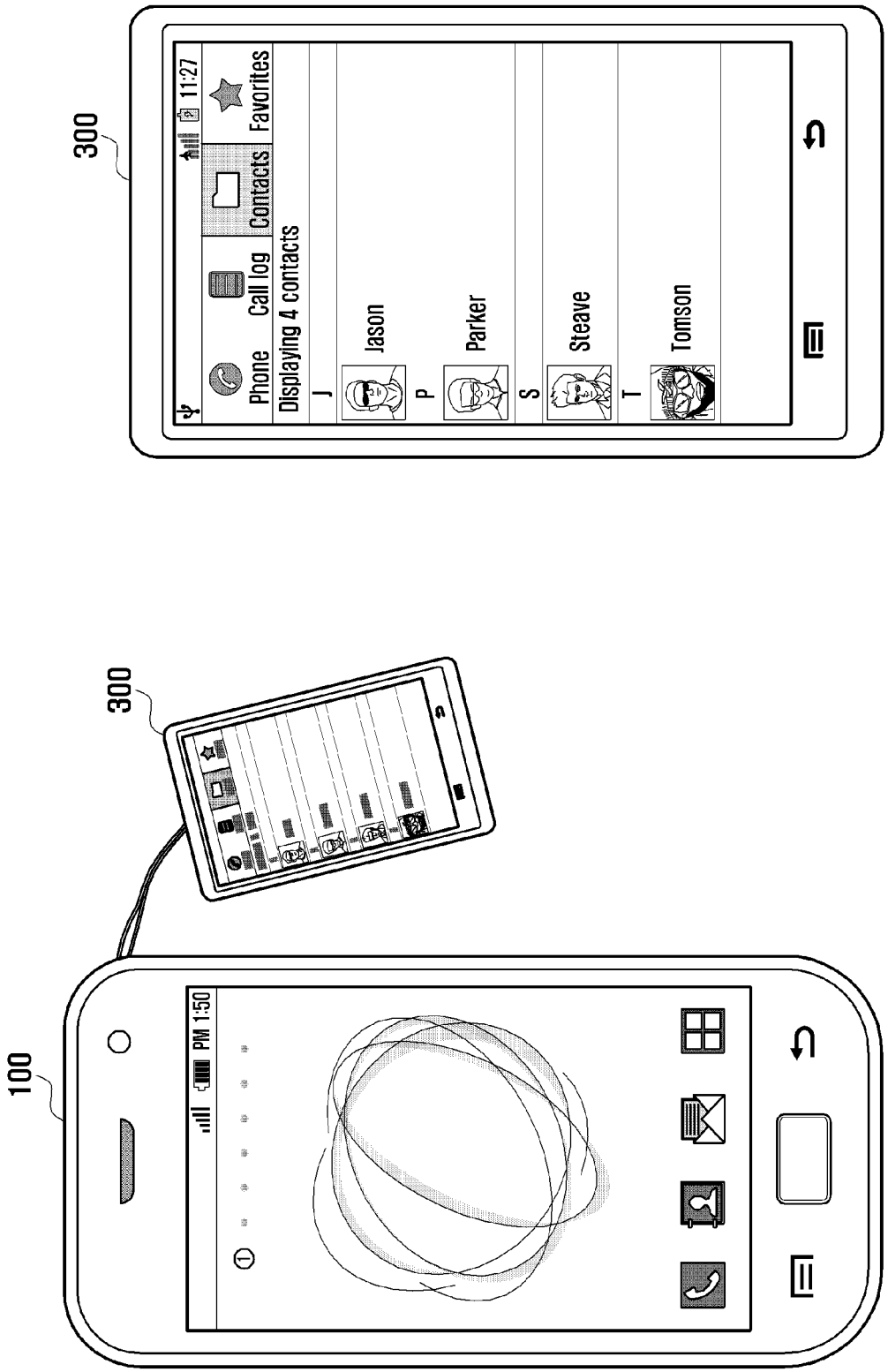
FIG. 8 is a diagram illustrating a set of the host device and the client device for supporting the remote file information system management system according to an embodiment of the present invention.

FIG. 8 is a diagram illustrating a set of the host device and the client device for supporting the remote file information system management system according to an embodiment of the present invention.

As shown in FIG. 8, the client device 300 is present nearby the host device 100. The client device 300 connects to the host device 100 via an NFC channel so as to edit the information stored in the host device 100 without need of changing the currently displayed screen of the host device 100. At the right part of FIG. 8, the client 300 is depicted with an exemplary screen displaying the phonebook information.

FIG. 9 is a diagram illustrating front views of the client device that are presenting exemplary screen images related to file information system management method according to an embodiment of the present invention.

In parts (a) and (c) of FIG. 9, the client device 300 displays a contact list screen and a contact edit screen by means of the display unit 332. The client device 300 is provided with the client phonebook application. When the file information system is received from the host device 100, the client device 300 displays the phonebook screen and executes the edit function by means of the client phonebook application.

Part (b) of FIG. 9 shows the memo information edit screen, and part (d) of FIG. 9 shows the message information display and edit screen that the client device can manipulate to perform the corresponding function.

As described above, the remote file information system management system and method of the present invention is capable of establishing an NFC connection between the host and client devices such that the user can edit the information of the host device by means of the client device. Accordingly, the remote file information system management system and method of the present invention is advantageous to edit the information of the host device without changing or closing the currently displayed screen of the host device.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A method for managing a file information system of a host device via a client device, comprising:
 establishing a near field communication channel between the client device and the host device;
 while a foreground-running application screen of the host device is maintained:
 copying at least part of the file information system of the host device from the host device to the client device;
 selecting, at the client device, an application listed in the file information system;
 editing, at the client device, user data associated with the selected application, by executing a matching application stored at the client device and displaying content associated with the editing;

transmitting the edited user data from the client device to the host device; and updating the file information system of the host device by storing the edited user data in a corresponding file.

2. The method of claim 1, wherein the file information system comprises at least one of system folders and application folders, and each folder includes at least one of files and subfolders.

3. The method of claim 2, further comprising:

transmitting, after copying the file information system, a polling signal from the client device to the host device at a predetermined interval; and generating, at the client device, an alarm when no response signal to the polling signal is received from the host device in response to the polling signal.

4. The method of claim 3, further comprising:

determining, at the client device when a response signal to the polling signal is received from the host device, whether the file information system of the host device is changed; and copying, when the file information system of the host device is changed, the changed file information system from the host device to the client device.

5. The method of claim 2, wherein editing comprises:

transmitting, when a file information system edit command is input to the client device, a file information system lock signal from the client device to the host device; and locking, when the file information system lock signal is received, the file information system at the host device.

6. The method of claim 2, wherein editing comprises:

transmitting, when a file information system edit complete command is input to the client device, a file information system unlock signal from the client device to the host device; and unlocking, when the file information system unlock signal is received, the file information system at the host device.

7. The method of claim 1, wherein the editing of the file information system of the host device is performed by the client device while the host device executes a voice communication requiring the host device positioned at a user's ear.

8. The method of claim 1, further comprising, prior to the editing:

transmitting, from the client device to the host device, a request for the user data associated with the selected application; and in response to the request, transmitting a file containing the user data from the host device to the client device.

9. The method of claim 1, wherein establishing the near field communication channel comprises performing an authentication process between the client device and the host device.

10. A system for managing a file information system of a host device via a client device, comprising:

a host device having a file information system, and configured to transmit the file information system to a client device via the near field communication channel; and a client device configured to: (a) copy at least part of the file information system from the host device, (b) select an application listed in the file information system, (c) edit user data by executing a matching application stored at the client device which displays content associated with the editing, and (d) to transmit the edited user data to the host device via the near field communication channel, with (a), (b), (c) and (d) being performed while a foreground-running application of the host device is maintained;

wherein the host device receives the edited user data and updates the file information system by storing the edited user data in a corresponding file.

11. The system of claim 10, wherein the file information system comprises at least one of system folders and application folders, and each folder includes at least one of files and subfolders.

12. The system of claim 11, wherein the client device transmits a polling signal from the client device to the host device at a predetermined interval, and generates an alarm when no response signal is received from the host device in response to the polling signal.

13. The system of claim 12, wherein the client device determines, when a response signal is received from the host device, whether the file information system of the host device is changed and copies, when the file information system of the host device is changed, the changed file information system from the host device.

14. The system of claim 11, wherein the client device transmits, when a file information system edit command is input, a file information system lock signal to the host device to lock the file information system in the host device.

15. The system of claim 14, wherein the client device transmits, when a file information system edit complete command is input, a file information system unlock signal to the host device to unlock the file information system in the host device.

16. The system of claim 10, wherein the editing of the file information system of the host device is performed by the client device while the host device executes a voice communication requiring the host device positioned at a user's ear.

17. The method of claim 8, wherein the file is a vCard File.

18. The method of claim 16, wherein the edited data is transmitted from the client device to the host device as part of a vCard File.

* * * * *